(12) United States Patent
Freking et al.

(10) Patent No.: US 9,292,462 B2
(45) Date of Patent: Mar. 22, 2016

(54) BROADCAST FOR A DISTRIBUTED SWITCH NETWORK

(71) Applicant: International Business Machines Corporation, Armonk, NY (US)

(72) Inventors: Ronald E. Freking, Issaquah, WA (US); Elizabeth A. McGlone, Rochester, MN (US); Daniel R. Spach, Pittsboro, NC (US); Curtis C. Wollbrink, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 435 days.

(21) Appl. No.: 13/899,810

(22) Filed: May 22, 2013

(65) Prior Publication Data

US 2014/0351484 A1    Nov. 27, 2014

(51) Int. Cl.
*G06F 13/40* (2006.01)
*H04L 12/933* (2013.01)

(52) U.S. Cl.
CPC .... *G06F 13/4022* (2013.01); *G06F 2213/0026* (2013.01); *H04L 49/10* (2013.01)

(58) Field of Classification Search
CPC .............. G06F 13/4022; G06F 2213/0026; H04L 49/10; H04L 49/15; H04L 49/20; H04L 49/70; H04L 49/201; H04L 45/16; H04L 45/44
See application file for complete search history.

(56) References Cited

U.S. PATENT DOCUMENTS

| 7,308,523 | B1 | 12/2007 | Ngai |
| 7,506,087 | B2 * | 3/2009 | Ho ........................ G06F 13/102 710/104 |
| 7,539,190 | B2 | 5/2009 | Stewart et al. |
| 7,877,536 | B2 | 1/2011 | Wojciechowski et al. |
| 8,335,884 | B2 | 12/2012 | Hamadani et al. |
| 8,352,661 | B1 * | 1/2013 | Sanville ............... H05K 7/1498 370/225 |
| 8,913,620 | B2 * | 12/2014 | Basso ..................... H04L 45/16 370/230.1 |
| 2008/0052443 | A1 | 2/2008 | Cassiday et al. |
| 2009/0172237 | A1 | 7/2009 | Wojciechowski et al. |
| 2011/0064089 | A1 | 3/2011 | Hidaka et al. |
| 2011/0296074 | A1 * | 12/2011 | Nordstrom .............. G06F 13/40 710/312 |
| 2014/0237156 | A1 * | 8/2014 | Regula .................... G06F 21/85 710/314 |

* cited by examiner

*Primary Examiner* — Brian Misiura
(74) *Attorney, Agent, or Firm* — Patterson & Sheridan, LLP

(57) ABSTRACT

Techniques for broadcasting a command in a distributed switch, at a first switch module within the distributed switch. Embodiments receive a request to reset a PCIe link for a first host device, the first host device connected to a plurality of downstream PCIe devices through the distributed switch. A routing table specifying a plurality of downstream switch modules, connected to the first switch modules by one or more ports of the first switch module, is identified. Embodiments suspend PCIe traffic for the first host device on the one or more ports of the first switch module. Broadcast messages are transmitted to the plurality of downstream switch modules, specifying a first reset operation. Upon receiving an acknowledgement message from each of the plurality of downstream switch modules specified in the routing table, embodiments resume PCIe traffic for the first host device on the one or more ports.

19 Claims, 8 Drawing Sheets

ROUTING TABLE 145-1A

| VIRTUAL BRIDGE ID | CHIP ID | SECONDARY BUS ID | SUBORDINATE BUS ID | MMIO RANGE |
|---|---|---|---|---|
| PTP A | CHIP C | BUS A | BUS A | 0X0000 - 0X0FFF |
| PTP C | CHIP D | BUS C | BUS C | 0X2000 - 0X2FFF |

FIG. 4

ROUTING TABLE 145-2A

| VIRTUAL BRIDGE ID | CHIP ID | SECONDARY BUS ID | SUBORDINATE BUS ID | MMIO RANGE |
|---|---|---|---|---|
| PTP B | CHIP C | BUS B | BUS B | 0X1000 - 0X1FFF |
| PTP D | CHIP D | BUS D | BUS D | 0X3000 - 0X3FFF |
| | | | | |

FIG. 5

ROUTING TABLE 145-1B

| VIRTUAL BRIDGE ID (609) | CHIP ID (610) | SECONDARY BUS ID (611) | SUBORDINATE BUS ID (612) | MMIO RANGE (614) |
|---|---|---|---|---|
| PTP A | CHIP C | BUS A | BUS A | 0X0000 - 0X0FFF |

ROUTING TABLE 145-2B

| VIRTUAL BRIDGE ID (709) | CHIP ID (710) | SECONDARY BUS ID (711) | SUBORDINATE BUS ID (712) | MMIO RANGE (714) |
|---|---|---|---|---|
| PTP B | CHIP C | BUS B | BUS B | 0X1000 - 0X1FFF |
| PTP D | CHIP D | BUS D | BUS D | 0X3000 - 0X3FFF |
| PTP C | CHIP D | BUS C | BUS C | 0X2000 - 0X2FFF |

BROADCAST FOR A DISTRIBUTED SWITCH NETWORK

BACKGROUND

The present invention relates to computer networking, and more specifically, to techniques for transmitting commands to downstream ports within a distributed switch module.

Computer systems often use multiple computers that are coupled together in a common chassis. The computers may be separate servers that are coupled by a common backbone within the chassis. Each server may be a pluggable board that includes at least one processor, an on-board memory, and an Input/Output (I/O) interface. Further, the servers may be connected to a switch to expand the capabilities of the servers. For example, the switch may permit the servers to access additional Ethernet networks or PCIe slots, as well as permit communication between servers in the same or different chassis.

Additionally, the switch itself may be a distributed system. For example, the distributed switch may include a plurality of switch modules and one or more control modules. Generally, the switch modules may each include a respective set of ports and could be configured to act as independent sub-switches. The control module(s) could provide control plane logic for the plurality of switch modules, and the control module(s) may be shared by the plurality of switch modules. One advantage to such a distributed switch is that distributed systems can oftentimes grow larger than conventional systems at less cost. Additionally, distributed systems are frequently more modular then conventional systems, allowing faulty, individual components to be isolated and replaced in a more efficient and inexpensive fashion.

SUMMARY

Embodiments provide a method, computer-readable storage medium and switch module for broadcasting a command at a first switch module within a distributed switch. The method, computer-readable storage medium and switch module include receiving a first request to reset a PCIe link for a first host device, where the first host device is connected to a plurality of downstream PCIe devices through the distributed switch. Additionally, the method, computer-readable storage medium and switch module include identifying a routing table specifying a plurality of downstream switch modules, connected to the first switch module by one or more ports of the first switch module. The method, computer-readable storage medium and switch module also include suspending PCIe traffic for the first host device on the one or more ports of the first switch module. Further, the method, computer-readable storage medium and switch module include transmitting a respective broadcast message to each of the plurality of downstream switch modules, specifying a first operation to be performed for resetting the PCIe link for the first host device. In addition, the method, computer-readable storage medium and switch module include, upon receiving an acknowledgement message from each of the plurality of downstream switch modules specified in the routing table, resuming PCIe traffic for the first host device on the one or more ports.

BRIEF DESCRIPTION OF THE SEVERAL VIEWS OF THE DRAWINGS

FIG. 4 depicts a block diagram of an example data structure for a routing table in an origin compute element, prior to the movement of ownership of a device from the origin compute element to a destination compute element, according to an embodiment disclosed herein.

FIG. 5 depicts a block diagram of an example data structure for a routing table in a destination compute element, prior to the movement of the ownership of a device from the origin compute element to the destination compute element, according to an embodiment disclosed herein.

FIG. 6 depicts a block diagram of an example data structure for a routing table in an origin compute element, after the movement of the ownership of a device from the origin compute element to the destination compute element, according to an embodiment disclosed herein.

FIG. 7 depicts a block diagram of an example data structure for a routing table in a destination compute element, after the movement of the ownership of a device from the origin compute element to the destination compute element, according to an embodiment disclosed herein.

DETAILED DESCRIPTION

Figure 1:
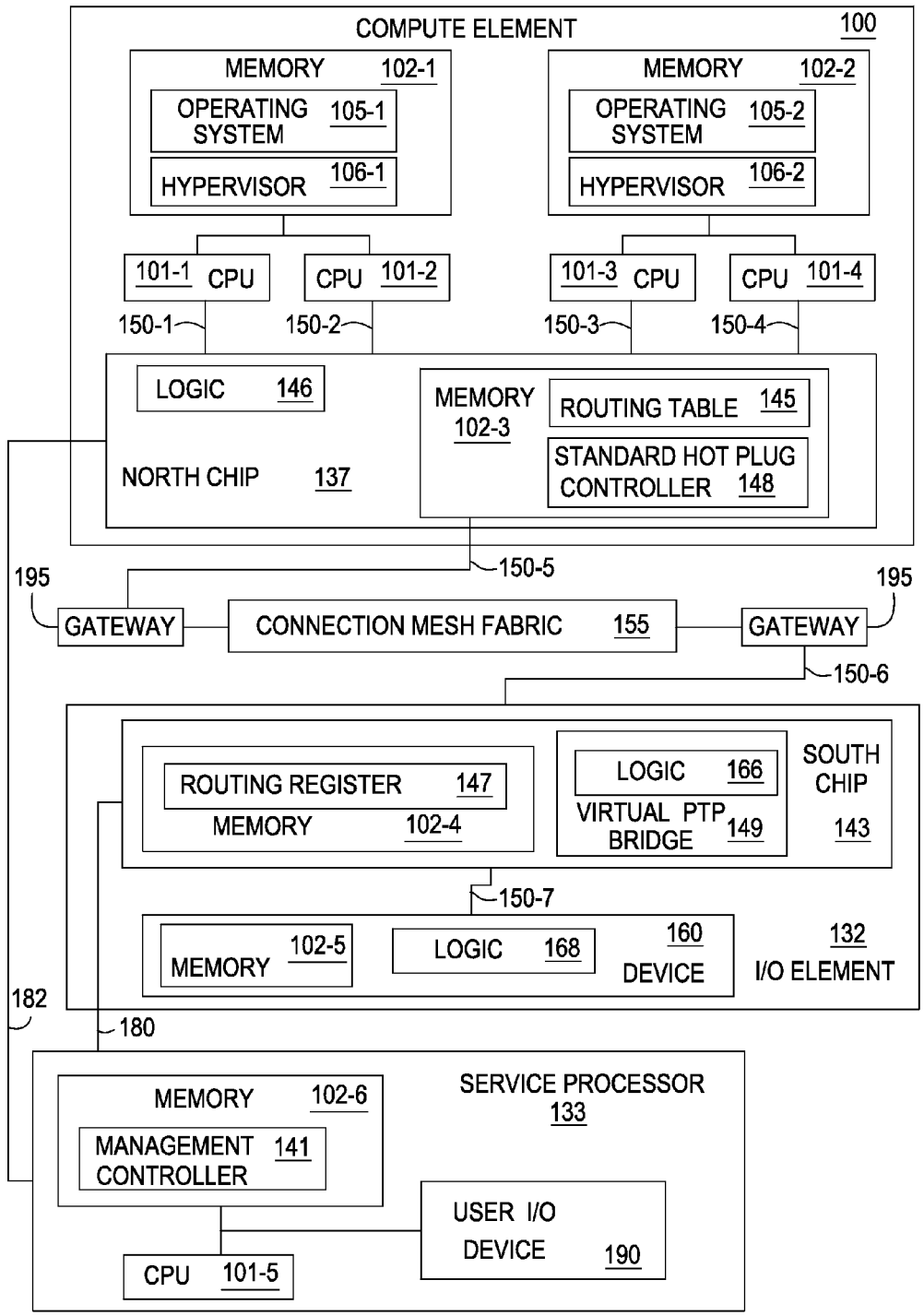
FIG. 1 depicts a high-level block diagram of an example system, according to an embodiment disclosed herein.

Generally, a distributed, virtual switch may include a plurality of switch modules, each of which contains a set of ports and logic to direct traffic between the ports. The distributed switch may also include one or more control modules (also referred to herein as a "switch management controller"), which provide control plane logic for the plurality of switch modules and are shared by the plurality of switch modules. Doing so can allow distributed switches to scale to larger sizes for less cost than conventional switches.

In some circumstances, it may be desirable for a controller to direct the actions of individual switch modules within a distributed switch. For example, if logic on a switch module detects that the link for one of its ports port has gone offline, the logic could disable traffic for the port until the link is reset. However, downstream switch modules and devices that have not yet discovered the link is offline could continue attempting to send traffic to the switch module over the link. In such a scenario, it may be desirable for a controller (e.g., controller logic on the switch module) to direct the actions of the downstream switch modules and devices to suspend traffic over the link, at least until the link is reset. Additionally, as some protocols may not provide a mechanism to transmit information, such as state change information for a particular link, to a multitude of different sources as a single operation. As an example, the PCIe protocol may not provide a single operation to broadcast a link status update to a plurality of different devices.

As such, embodiments generally provide techniques for broadcasting a command from a first switch module within a distributed switch. For instance, embodiments could receive a request to reset a PCIe link for a first host device, connected to a plurality of downstream PCIe devices the distributed switch. Embodiments could determine one or more ports of the first switch module that correspond to the downstream PCIe devices and could suspend traffic for the first host device on these ports. Additionally, embodiments could identify a routing table specifying a plurality of downstream switch modules, and could transmit a respective broadcast message to each of the plurality of downstream switch modules, specifying a first operation to be performed for resetting the respective PCIe link for the first host device. Upon receiving an acknowledgement message from each of the plurality of downstream switch modules specified in the routing table, PCIe traffic for the first host device could be resumed on the first port.

These techniques for broadcasting a message within a distributed switch are discussed in more detail in Section II below. However, Section I first describes an exemplary environment in which embodiments may be implemented. Of note, while embodiments may be implemented in the distributed switch environment described in Section I, such an environment is provided for illustrative purpose only and without limitation. Moreover, it is broadly contemplated that embodiments may implemented in any switch or network environment, consistent with the functionality described herein.

I. Distributed Switch Overview

In a distributed switch that uses PCI communication, a host (e.g., a compute device, or more specifically, a processor) may be connected to multiple endpoints (e.g., storage, special hardware, etc). Similarly, an endpoint may be connected to multiple hosts. One protocol that permits a single endpoint to be connected to a plurality of different hosts using different PCI connections is known as multi-root input/output virtualization (MR-IOV). The MR-IOV specification includes details of virtual channel to virtual link mapping which enables the creation of multiple independent data flows between hosts and endpoints (i.e., virtual hierarchies) and resources across a system. For example, an endpoint may have four separate resources (e.g., four different memory elements) that may be assigned to four different hosts. The virtual hierarchy refers to the individual host to which the individual resources of the endpoints belong. Thus, the endpoint provides four different virtual hierarchies which may be connected to four different hosts. A MR-IOV PCIe switch may maintain a routing table that indicates which host owns which resource in an endpoint. In this manner, the individual resources in a single endpoint communicate with different hosts using the routing logic of the virtual hierarchies stored in the PCIe switch.

Hot-plug technology allows a user to physically remove or insert one or more PCI devices without having to remove power to the entire system or re-booting the system software. Only the individual PCI/PCI-X/PCI Express slots are affected and the other devices in the system are not disrupted. The PCI Standard Hot-Plug Controller and Subsystem Specification, Revision 1.0, Jun. 20, 2001, PCI Special Interest Group, Portland, Oreg., (hereinafter "SHPC Specification") was developed so that vendor-specific hot-plug controllers could be compatible across many platforms.

The SHPC specification may be used to generate PCI messages in a distributed switch to disconnect and/or connect endpoints from hosts that are connected based on the MR-IOV protocol—also referred to as changing the ownership of the endpoint (or the individual resources in the endpoint) or disconnecting and/or connecting virtual hierarchies. Specifically, a management controller may instruct a standard hot-plug controller (SPHC) to generate a PCI packet that specifies a particular target device (i.e., an endpoint) to disconnect from a particular host. An upstream port connected to the host and the SHPC receives the PCI packet and uses the target device's address in the packet to index into a routing table to identify a downstream port in the distributed switch that is connected to the target device. Based on this address translation, the PCI packet is routed through the distributed switch and arrives at the downstream port. Thus, the host and the SHPC do not need to contain any information about the mesh fabric that interconnects the different upstream and downstream ports in the distributed switch. Instead, the routing table permits the upstream port to identify the proper downstream port based on the destination address specified in the PCI packet generated by the SHPC.

The information in the packet instructs the downstream port to change a routing register that logically disconnects the downstream port from the upstream port in the distributed switch. That is, the SHPC instructs the distributed switch to disconnect the host and target device without having to physically remove either the host or the endpoint (i.e., the PCI device). After the compute elements are logically disconnected, the host and/or target device may be connected to other virtual hierarchies by updating the routing table and routing register located in the hardware chips containing the upstream and downstream ports.

Referring to the Drawings, wherein like numbers denote like parts throughout the several views, FIG. 1 depicts a high-level block diagram representation of a computer system comprising the major components of a compute element 100 connected to an I/O (Input/Output) element 132 via gateways 195 (e.g., a transport layer) and a connection mesh fabric 155. The I/O element 132 is also connected to a service processor 133 via a communications link 180, and the compute element 100 is connected to the service processor 133 via a communications link 182.

The components of the compute element 100 comprise memory 102-1, memory 102-2, central processing units (CPUs) 101-1, 101-2, 101-3, and 101-4, and a north chip 137. The CPUs 101-1 and 101-2 are connected to and share the memory 102-1, and the CPUs 101-3 and 101-4 are connected to and share the memory 102-2 via respective memory buses. The CPUs 101-1, 101-2, 101-3, and 101-4 are connected to the north chip 137 via respective buses 150-1, 150-2, 150-3, and 150-4. The CPUs 101-1, 101-2, 101-3, and 101-4 are also referred to herein as processors. The north chip 137 is connected to the connection mesh fabric 155 via a bus 150-5 and a gateway 195.

In various embodiments, the compute element 100 and/or the service processor 133 are multi-user mainframe computer systems, single-user computer systems, or server computer systems that have little or no direct user interface, but receive requests from other computer systems (clients). In other embodiments, the compute element 100 and/or the service processor 133 are implemented as desktop computers, portable computers, laptop or notebook computers, tablet computers, pocket computers, telephones, smart phones, pagers, automobiles, teleconferencing system, appliances, or any other appropriate type of electronic device.

Each processor 101-1, 101-2, 101-3, and 101-4 executes instructions stored in the memory 102-1 or 102-2, and each processor may also include cache memory. The memories 102-1 and 102-2 store or encode respective operating systems 105-1 and 105-2, which, when executed on the respective processors, control the operations of the compute element 100. The memories 102-1 and 102-2 further store or encode respective hypervisors 106-1 and 106-2, which, when executed on the respective processors, may allocate memory or hardware to their respective operating systems 105-1 and 105-2. The compute element 100 may use virtual addressing mechanisms that allow the programs of the compute element 100 to behave as if they only have access to a large, single storage entity instead of access to multiple, smaller storage entities. Thus, all portions of an operating system 105-1 and 105-2 are not necessarily completely stored in the same storage device at the same time.

In various embodiments, the north chip 137 is implemented as a chip, integrated circuit, circuit board, logic devices, memory, and/or a processor. The north chip 137 comprises logic 146, a routing table 145, and a SHPC 148. The routing table 145 is stored in memory 102-3 and comprises translations, mappings, or assignments of virtual bridge identifiers and chip identifiers to secondary bus identifiers, subordinate bus identifiers, and MMIO bus address ranges, as further described below with reference to FIGS. 4, 5, 6, and 7. The logic 146 controls the operations of the north chip 137. The SHPC 148 may be used by the management controller 141 to initiate a change of ownership by logically disconnecting a device 160 from a compute element 100. Additionally, the SHPC 148 may perform other functions such as powering up and powering down of the slots to allow, for example, adapter cards (e.g., devices 160) to be inserted or removed from the slots without powering down the system or re-booting the software. Moreover, in other embodiments, the SHPC 148 may located elsewhere, such as in a different location within compute element 100, in service processor 133, within I/O element 132, or in a different computing device not shown in FIG. 1.

In an embodiment, the connection mesh fabric 155 comprises a point-to-point serial connection between the compute element 100 and the I/O element 132 via the gateways 195. In other embodiments, the connection mesh fabric 155 may be any suitable network or combination of networks and may support any appropriate protocol suitable for communication of data and/or code to/from the compute element 100 and the I/O element 132. In an embodiment, the connection mesh fabric 155 may be implemented via an Ethernet network, but in other embodiments any appropriate network or combination of networks implementing any appropriate protocol may be used.

In an embodiment, the connection mesh fabric 155 uses a different communications protocol than do the buses 150-5 and 150-6, and the gateways 195 are electronic components that join and translate between buses of different protocols. Although the gateways 195 are illustrated as separate from the compute element 100, the connection mesh fabric 155, and the I/O element 132, in other embodiments, the gateways 195 may be implemented as a component in the compute element 100, in the connection mesh fabric 155, or in the I/O element 132.

In various embodiments, the I/O element 132 is implemented as a system element, an electronic device, an endpoint, a computer, or a circuit board. The I/O element 132 comprises a south chip 143 connected to the connection mesh fabric 155 via a bus 150-6 and a gateway 195. The south chip 143 is further connected to a device 160 via a bus 150-7. The south chip 143 is implemented as a chip, integrated circuit, circuit board, logic devices, memory, and/or a processor. In an embodiment, the south chip 143 is identical to the north chip 137, but the chips 137 and 143 perform different functions depending on whether they are located on the compute element 100 or the I/O element 132. In another embodiment, the chips 137 and 143 are different, and each is customized for its respective element.

The south chip 143 comprises memory 102-4 and a virtual PTP (PCI to PCI) bridge 149, which comprises logic 166. A virtual bridge is an electronic component or components that forward packets of data and/or commands between two different networks, different segments of networks, or different buses that use the same communications protocol, based on a destination address in the packet. Although an embodiment of the invention is described in the context of the PCI EXPRESS bus protocol, in other embodiments any appropriate bus protocol may be used. The memory 102-4 comprises a routing register 147.

In an embodiment, the device 160 is a storage device or a combination of storage devices, either connected within the I/O element 132 or connected directly or indirectly to the I/O element 132. In another embodiment, the device 160 comprises a network adapter, I/O adapter, or I/O processor that connects to a communications network. Although the device 160 is illustrated as being contained within the I/O element 132, in another embodiment, the device 160 is separate from and connected to the I/O element 132. The device 160 comprises logic 168 and memory 102-5, which the compute element 100 may access via MMIO commands, requests, or operations sent to the device 160 via the connection mesh fabric 155, the gateways 195, and the south chip 143.

In an embodiment, the operating systems 105-1 and 105-2, the hypervisors 106-1 and 106-2, and the logic 146, 166, and 168 are implemented as chips, circuits, and/or logic devices. In another embodiment, some or all of the logic 146, 166, and/or 168 comprise memory encoded with instructions or statements and a processor on which the instructions or statements execute or are interpreted. In an embodiment, the operating systems 105-1 and 105-2 and the hypervisors 106-1 and 106-2 comprise instructions that execute on their respective processors 101-1, 101-2, 101-3, and 101-4 or statements that are interpreted by instructions that execute on their respective processors 101-1, 101-2, 101-3, and 101-4 to perform processing, operations, or functions. The logic 146, 166, and 168 generally performs processing, operations, or functions.

Although the buses 150-1, 150-2, 150-3, 150-4, 150-5, 150-6, and 150-7 are shown in FIG. 1 as relatively simple, single bus structures providing direct communication paths, in fact the buses 150-1, 150-2, 150-3, 150-4, 150-5, 150-6, and 150-7 may comprise multiple different buses or communication paths, which may be arranged in any of various forms, such as point-to-point links in hierarchical, star or web configurations, multiple hierarchical buses, parallel and redundant paths, or any other appropriate type of configuration. In an embodiment, the buses 150-1, 150-2, 150-3, 150-4, 150-5, 150-6, and 150-7 are point-to-point serial buses, such as the PCI EXPRESS bus, but in other embodiments, any appropriate bus may be used. Further, buses 150-1, 150-2, 150-3, 150-4, 150-5, 150-6, and 150-7 may comprise memory buses, I/O buses, I/O bus interface units, I/O processors, or any multiple and/or combination thereof.

The service processor 133 comprises memory 102-6 connected via a bus to a CPU 101-5 and a user I/O device 190. The memory 102-6 stores or encodes a management controller 141. In an embodiment, the management controller 141 comprises instructions or statements that execute or are interpreted by instructions that execute on the CPU 101-5. In another embodiment, the management controller 141 comprises circuits or logic devices in lieu of or in addition to a processor based system. The management controller 141 generally performs processing, operations, or functions.

In various embodiments, the user input/output device 190 may include user output devices (such as a video display device, speaker, printer, and/or television set) and user input devices (such as a keyboard, mouse, keypad, touchpad, trackball, buttons, light pen, or other pointing device). A user may manipulate the user input devices, in order to provide input to the user input/output device 190 and the management controller 141 via a user interface, and may receive output via the user output devices. For example, a user interface may be presented via the user I/O device 190, such as displayed on a display device, played via a speaker, or printed via a printer.

In various embodiments, the memory 102-1, 102-2, 102-3, 102-4, 102-5, and 102-6 are random-access semiconductor memory, registers, storage devices, non-volatile memory, volatile memory, disk drives, or storage mediums for storing or encoding data and programs. The memory 102-1, 102-2, 102-3, 102-4, 102-5, and 102-6 are conceptually single monolithic entities, but in other embodiments the memory 102-1, 102-2, 102-3, 102-4, 102-5, and 102-6 are more complex arrangements, such as hierarchies of caches and/or other memory devices. For example, the memory 102-1, 102-2, 102-3, 102-4, 102-5, and 102-6 may exist in multiple levels of memory devices of varying sizes and speeds.

FIG. 1 is intended to depict select components of the compute element 100, the connection mesh fabric 155, the gateways 195, the I/O element 132, and the service processor 133 at a high level. Individual components may have greater complexity than represented in FIG. 1, components other than or in addition to those shown in FIG. 1 may be present, and the number, type, and configuration of such components may vary. Several particular examples of such additional complexity or additional variations are disclosed herein, but these are by way of example only and are not necessarily the only such variations.

The various program components illustrated in FIG. 1 and implementing various embodiments of the invention may be implemented in a number of manners, including using various computer applications, routines, components, programs, objects, modules, data structures, etc., and are referred to hereinafter as "computer programs," or simply "programs." The computer programs comprise one or more instructions or statements that are resident at various times in various memory and storage devices in the compute element 100, the I/O element 132, the service processor 133, and/or the device 160 and that, when read and executed by one or more processors in the compute element 100, the I/O element 132, the service processor 133, and/or the device 160 or when interpreted by instructions that are executed by one or more processors, cause the compute element 100, I/O element 132, the service processor 133, and/or the device 160 to perform the actions necessary to execute steps or elements comprising the various aspects of embodiments of the invention.

Furthermore, embodiments of the present invention may take the form of a computer program product embodied in one or more computer-readable medium(s) having computer-readable program code embodied thereon. Any combination of one or more computer-readable medium(s) may be utilized. The computer-readable medium may be a computer-readable signal medium or a computer-readable storage medium. A computer-readable storage medium, may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage media may comprise: an electrical connection having one or more wires, a portable computer diskette, a hard disk, a random access memory (RAM), a read-only memory (ROM), an erasable programmable read-only memory (EPROM) or Flash memory, an optical fiber, a portable compact disc read-only memory (CD-ROM), an optical storage device, a magnetic storage device, or any suitable combination of the foregoing. A computer-readable storage medium may be any non-transitory tangible medium that can contain, or store, a program for use by or in connection with an instruction execution system, apparatus, or device. Examples of computer-readable storage media include the memory 102-1, 102-2, 102-3, 102-4, 102-5, and 102-6.

These computer program instructions may also be stored in a computer-readable medium that can direct a computer, other programmable data processing apparatus, or other devices to function in a particular manner, such that the instructions stored in the computer-readable medium produce an article of manufacture, including instructions that implement the function/act specified by the flowchart and/or block diagram block or blocks. The computer programs defining the functions of various embodiments of the invention may be delivered to the compute element 100, the I/O element 132, the service processor 133, and/or the device 160 via a variety of tangible computer-readable storage media that may be operatively or communicatively connected (directly or indirectly) to the processor or processors.

The computer program instructions may also be loaded onto a computer, the compute element 100, the I/O element 132, the service processor 133, and/or the device 160, other programmable data processing apparatus, or other devices to cause a series of operational steps to be performed on the computer, other programmable apparatus, or other devices to produce a computer-implemented process, such that the instructions, which execute on the computer or other programmable apparatus, provide processes for implementing the functions/acts specified in the flowcharts and/or block diagram block or blocks.

Embodiments of the present invention may also be delivered as part of a service engagement with a client corporation, nonprofit organization, government entity, or internal organizational structure. Aspects of these embodiments may comprise configuring the compute element 100, the I/O element 132, the service processor 133, and/or the device 160 to perform, and deploying computing services (e.g., computer-readable code, hardware, and web services) that implement, some or all of the methods described herein. Aspects of these embodiments may also comprise analyzing the client company, creating recommendations responsive to the analysis, generating computer-readable code to implement portions of the recommendations, integrating the computer-readable code into existing processes, compute elements, and computing infrastructure, metering use of the methods and systems described herein, allocating expenses to users, and billing users for their use of these methods and systems.

In addition, various programs described hereinafter may be identified based upon the application for which they are implemented in a specific embodiment of the invention. But, any particular program nomenclature that follows is used merely for convenience, and thus embodiments of the invention should not be limited to use solely in any specific application identified and/or implied by such nomenclature. The exemplary environments illustrated in FIG. 1 are not intended to limit the present invention. Indeed, other alternative hardware and/or program environments may be used without departing from the scope of embodiments the invention.

Figure 2:
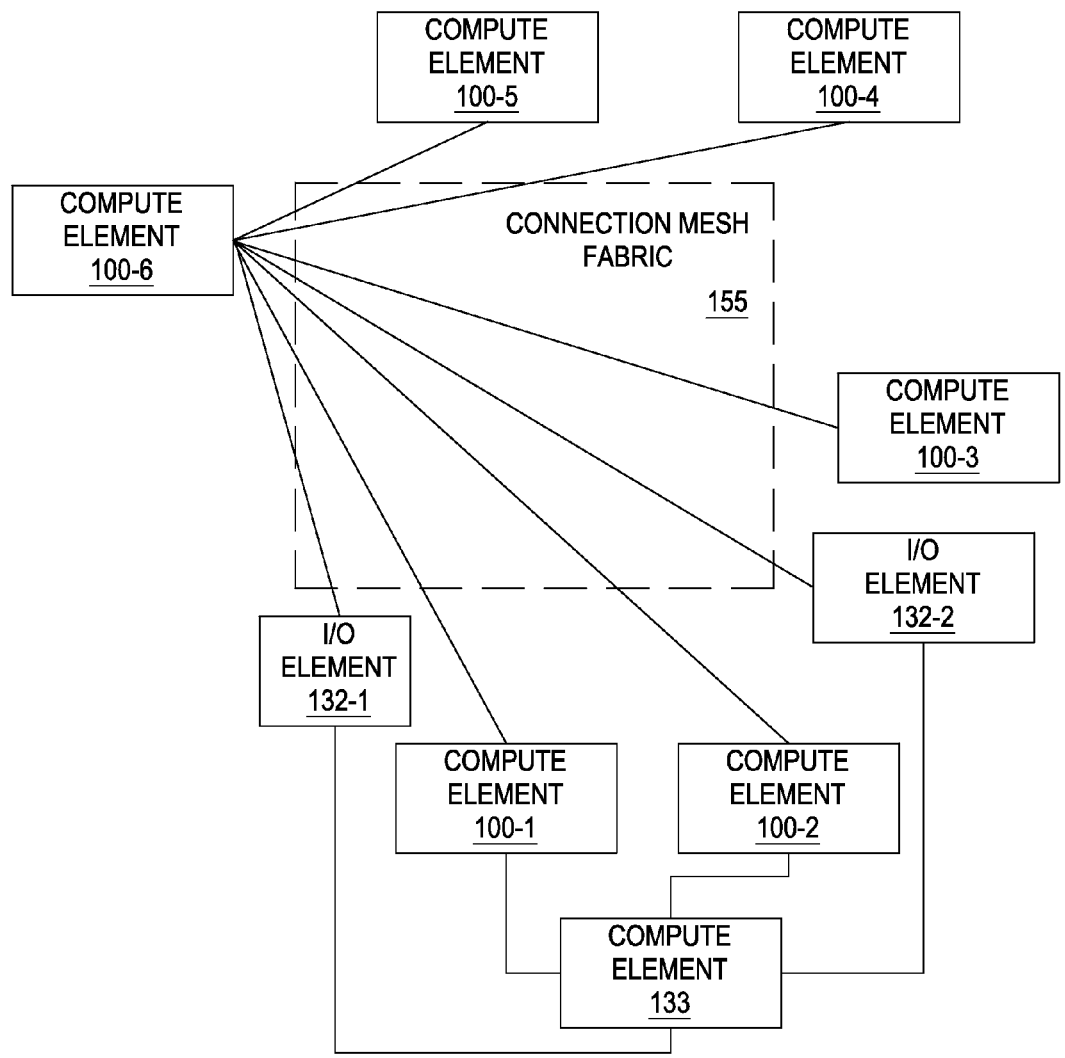
FIG. 2 depicts a block diagram illustrating selected components from FIG. 1, according to an embodiment disclosed herein.

FIG. 2 depicts a block diagram illustrating the interaction of selected components of an embodiment of the invention. The compute elements 100-1, 100-2, 100-3, 100-4, 100-5, and 100-6, and the I/O elements 132-1 and 132-2 are connected via the connection mesh fabric 155 and the gateways 195 (FIG. 1). The compute elements 100-1, 100-2, 100-3,

100-4, 100-5, and 100-6 are examples of, and are generically referred to by, the compute element 100 (FIG. 1). The I/O elements 132-1 and 132-2 are examples of, and are generically referred to by, the I/O element 132 (FIG. 1).

The connection mesh fabric 155 comprises serial point-to-point links. In another embodiment, the connection mesh fabric 155 comprises parallel point-to-point links. For convenience of illustration, FIG. 2 depicts compute element 100-6 as connected to every other compute and I/O element 100-1, 100-2, 100-3, 100-4, 100-5, 132-1, and 132-2. But, all compute elements 100 and I/O elements 132 are connected to each and every other compute element 100 and I/O element 132 via high speed point-to-point links in an interconnection of everything-to-everything, which is referred to as the connection mesh fabric 155. Thus, e.g., the compute elements 100-1 and 100-2 are both connected to the I/O element 132-1 via different point-to-point connections. As another example, the compute elements 100-1 and 100-2 are both connected to the I/O element 132-2 via different point-to-point connections. Thus, if one point-to-point link fails, elements may still communicate to each other by hopping though another element. In an embodiment, the connection mesh fabric 155 is not necessarily confined to a single chassis or rack, but may span multiple chassis or racks.

The service processor 133 is illustrated as connected to the compute elements 100-1 and 100-2 and the I/O elements 132-1 and 132-2, but in other embodiments, the service processor 133 is connected to every compute element 100 and I/O element 132.

Figure 3:
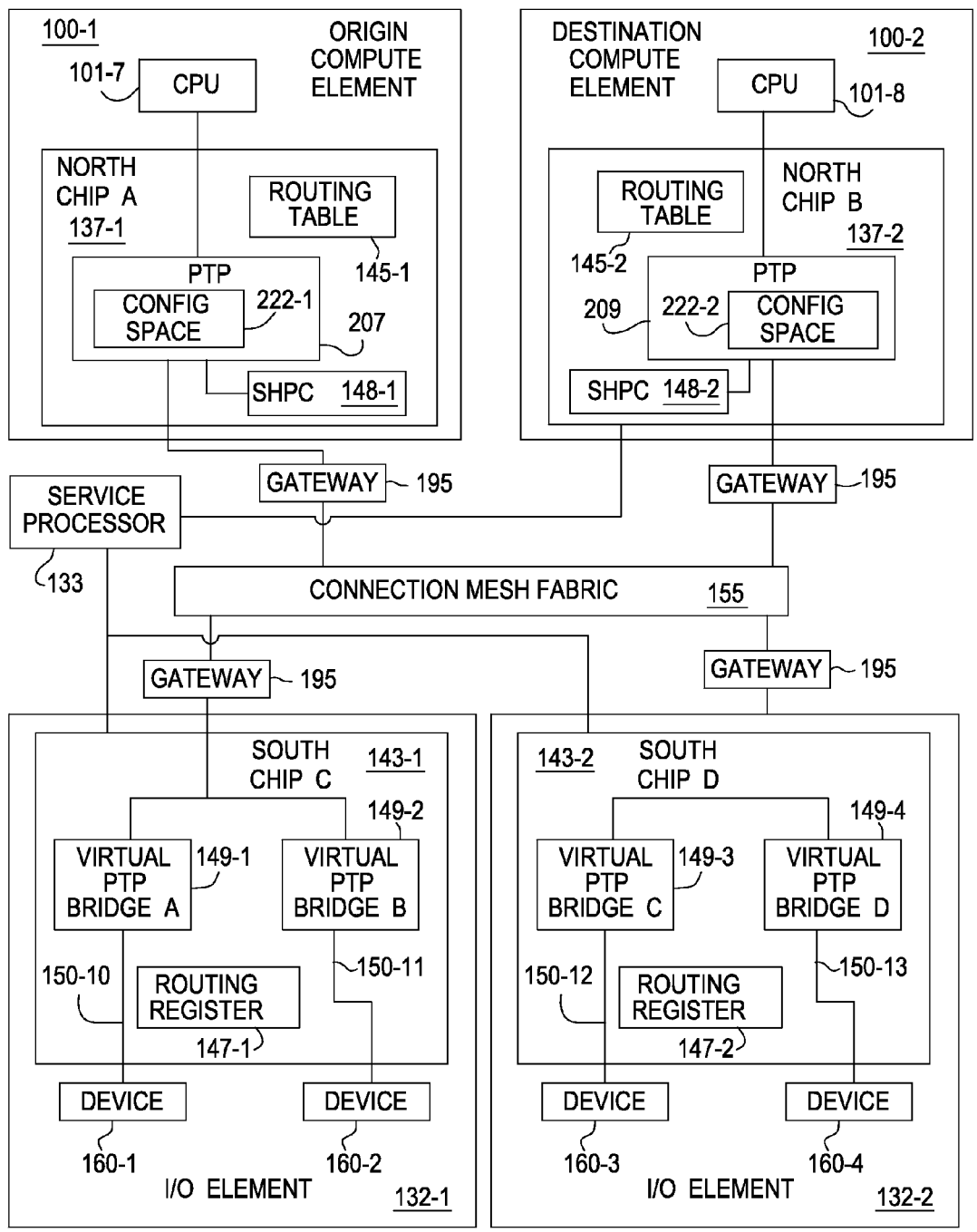
FIG. 3 depicts a block diagram illustrating more detail of selected components from FIG. 1, according to an embodiment disclosed herein.

FIG. 3 depicts a block diagram illustrating more detail of selected components of an embodiment of the invention. As illustrated in FIG. 3, the compute elements 100-1 and 100-2 are connected via the gateways 195 and the connection mesh fabric 155 to the I/O elements 132-1 and 132-2. The compute element 100-1 comprises a CPU 101-7 connected via a bus to a PTP (PCI to PCI) bridge 207 in a north chip 137-1. The north chip 137-1 is further connected to the service processor 133. The CPU 101-7 is an example of the CPUs 101-1, 101-2, 101-3, or 101-4 (FIG. 1).

The north chip 137-1 comprises a PTP bridge 207, meaning that both the ingress and egress buses that are connected to respective ingress and egress ports of the PTP bridge 207 are the same type of bus using the same protocol, such as in an embodiment, both being PCI buses. The PTP bridge 207 comprises a configuration space 222-1 stored in memory and a SHPC 148-1, which is further described below in FIG. 19. The north chip 137-1 further comprises a routing table 145-1, which is an example of, and is generically referred to by, the routing table 145 (FIG. 1). The north chip 137-1 is an example of, and is generically referred to by, the north chip 137 (FIG. 1).

The compute element 100-2 comprises a CPU 101-8 connected via a bus to a PTP bridge 209 in a north chip 137-2. The north chip 137-2 is further connected to the service processor 133. The CPU 101-8 is an example of the CPUs 101-1, 101-2, 101-3, or 101-4 (FIG. 1).

The north chip 137-2 comprises the PTP (PCI to PCI) bridge 209, meaning that both the ingress and the egress bus that are connected to respective ingress and egress ports of the PTP bridge 209 communicate via the same bus protocol, such as in an embodiment both being PCI buses. The PTP bridge 209 comprises a configuration space 222-2 stored in memory and SHPC148-2 which is further described in FIG. 19. The north chip 137-2 further comprises a routing table 145-2, which is an example of, and is generically referred to by, the routing table 145 (FIG. 1). The north chip 137-2 is an example of, and is generically referred to by, the north chip 137 (FIG. 1).

The I/O element 132-1 comprises a south chip 143-1 connected to the gateway 195 via an ingress port and a bus and connected to the devices 160-1 and 160-2 via respective egress ports and buses 150-10 and 150-11. The south chip 143-1 comprises a routing register 147-1, which is an example of, and is generically referred to by the routing register 147 (FIG. 1). The south chip 143-1 further comprises a virtual PTP bridge 149-1 and a virtual PTP bridge 149-2, which are examples of, and generically referred to by, the virtual PTP bridge 149 (FIG. 1). The virtual PTP bridge 149-1 is connected via an egress port and the bus 150-10 to the device 160-1, and the virtual PTP bridge 149-2 is connected via an egress port and the bus 150-11 to the device 160-2.

In an embodiment, a single port may act as an ingress port at one time while data is being transmitted in one direction and an egress port at other time at another time while data is being transmitted in the other direction. In another embodiment, a single port only acts as an ingress or an egress port, and multiple ports are present, in order to provide bi-directional data transfer (both from a compute element 100 to a device 160 and from a device 160 to a compute element 100). Also, the I/O elements 132 may have multiple ports connecting to the gateways 195, in order to provide the everything-to-everything connection to other elements via the connection mesh fabric 155.

The I/O element 132-2 comprises a south chip 143-2 connected to the gateway 195 via an ingress port and bus and connected to the devices 160-3 and 160-4 via respective egress ports and bus 150-12 and 150-13. The south chip 143-2 comprises a routing register 147-2, which is an example of, and is generically referred to by the routing register 147 (FIG. 1). The south chip 143-2 comprises virtual PTP bridges 149-3 and 149-4, which are examples of, and generically referred to by, the virtual PTP bridge 149 (FIG. 1). The virtual PTP bridge 149-3 is connected via an egress port and the bus 150-12 to the device 160-3, and the virtual PTP bridge 149-4 is connected via an egress port and the bus 150-13 to the device 160-4.

The devices 160-1, 160-2, 160-3, and 160-4 are examples of, and are generically referred to by, the device 160 (FIG. 1). Each of the devices 160-1, 160-2, 160-3, and 160-4 stores or encodes in its memory a respective MMIO address range. These MMIO addresses ranges may be different for different compute elements, meaning that a different compute element may access the same memory location within a device 160 via different ranges of MMIO addresses. In other embodiments, instead of providing storage, the devices 160 may be used to expand the processing capabilities of the compute elements 100-1 and 100-2 (e.g., the devices 160 may be adapter cards or expansion cards) or provide additional I/O capabilities. The buses 150-10, 150-11, 150-12, and 150-13 are examples of, and are generically referred to by, the bus 150-7 (FIG. 1).

FIG. 4 depicts a block diagram of an example data structure and values for a routing table 145-1A in an origin compute element, prior to the movement of ownership of a device, which may include one or more resources and corresponding virtual hierarchies, from the origin compute element to a destination compute element, according to an embodiment of the invention. The routing table 145-1A is an example of, and is generically referred to by the routing table 145-1 (FIG. 3). The routing table 145-1A comprises example entries or rows 401 and 402, each of which includes a virtual PTP bridge identifier field 409, a south chip identifier field 410, a secondary bus identifier field 411, a subordinate bus identifier field 412, and an MMIO bus address range field 414. Although the embodiments that follow discuss using the routing tables 145 to map specific MMIO address ranges to a virtual bridge ID 409 and chip ID 410, the present disclosure is not limited to such.

The MMIO bus address range field 414 specifies a range or extent of MMIO addresses that the compute element 100-1 may use to address or access the memory of a device or devices 160 that are downstream from the virtual PTP bridge 149 (identified by the value in the virtual PTP bridge identifier field 409 in the same entry) in a south chip 143 (identified by the value in the south chip identifier 410 in the same entry). Thus, the MMIO bus address range assigned to a virtual PTP bridge 149 is the range of MMIO addresses that are assigned and addressable to devices 160 downstream from that virtual PTP bridge 149. The downstream device or devices 160 are connected to the virtual PTP bridge 409 via a bus or buses whose bus identifiers are encompassed by, or are within, the bus range specified by the secondary bus identifier 411 and the subordinate bus identifier 412, in the same entry. The secondary bus identifier 411 identifies the first bus that is immediately downstream from the virtual PTP bridge 409 and that connects directly to the virtual PTP bridge 409, in the same entry. The subordinate bus identifier 412 specifies the highest (largest) bus identifier of all of the buses that can be reached downstream from the virtual PTP bridge 409. In various embodiments, buses that can be reached (are reachable) downstream from the virtual PTP bridge 409 are connected directly to the virtual PTP bridge 409 or indirectly through other PTP bridges. Downstream refers to a relative physical position of a component (either a bus or a device 160) that is farther from the compute element 100 than is the relative position of a component that is upstream, or nearer to the compute element 100.

Using the example of FIG. 3, the device 160-1 is downstream from the virtual PTP bridge A 149-1, and the virtual PTP bridge A 149-1 is upstream from the device 160-1 because the device 160-1 is farther from the compute element 100-1 than is the virtual PTP bridge A 149-1. The device 160-3 is downstream from the virtual PTP bridge C 149-3, and the virtual PTP bridge C 149-3 is upstream from the device 160-3 because the device 160-3 is farther from the compute element 100-2 than is the virtual PTP bridge C 149-3.

Referring again to FIG. 4, each example entry 401 and 402 has identical respective secondary bus identifiers 411 and subordinate bus identifiers 412 because, in the example of FIG. 3, each virtual PTP bridge has only one downstream bus. But, in other embodiments, the I/O elements 132 may include a hierarchy of virtual PTP bridges 149, in which a particular virtual PTP bridge has multiple downstream PTP bridges and/or buses.

The MMIO bus address range field 414 specifies a beginning (lower bound or memory base address) of the range and an end (upper bound or memory limit address) of the range. The memory base address is less than the memory limit address. The values in the MMIO bus address range field 414 are unique within the compute element 100-1 that assigns them, but are not necessarily unique within a south chip 143 or across all south chips 143. That is, multiple devices 160 connected to the same south chip 143 may have the same range values, different range values, or overlapping range values in their respective MMIO bus address range fields (in different routing tables 145 in different north chips 137) if those values were assigned by different compute elements 100. Further, multiple devices 160 connected to different south chips 143 may have the same values or overlapping range values in their respective MMIO bus address range fields (in different routing tables 145 in different north chips 137) if those values were assigned by different compute elements 100. Range values overlap if the memory base address of one range is between the memory base address and memory limit address of another range. Also, range values overlap if the memory limit address of one range is between the memory base address and memory limit address of another range.

Thus, the entries of the routing table 145-1A represent translations of MMIO bus address ranges 414, secondary bus identifiers 411, and subordinate bus identifiers 412 used by the compute element 100-1 to virtual PTP bridge identifiers 409 that identify virtual PTP bridges 149 that are contained within south chips 143 identified by the chip identifiers 410, in the same entry. Hence, the MMIO bus address range 414, the secondary bus identifier 411, and the subordinate bus identifier 412 are assigned to the virtual PTP bridge identifier 409 and the south chip identifier 410 in the same entry. The assignment or ownership of the MMIO bus address range 414, the secondary bus identifier 411, and the subordinate bus identifier 412 to the virtual PTP bridge identifier 409 and the south chip identifier 410 is unique within the routing table 145-1A, meaning that no two entries in a routing table 145-1A contain the same or overlapping MMIO bus address ranges 414.

The example entry 401 in the routing table 145-1A comprises data that indicates that the south chip 143-1 identified by the value "Chip C" in the south chip identifier field 410 comprises a virtual PTP bridge 149-1 identified by the value "PTP A" in the virtual PTP bridge identifier field 409 that is assigned or that translates or maps to a secondary bus identifier 411 of "Bus A," a subordinate bus identifier 412 of "Bus A," and an MMIO bus address range 414 of 0x0000-0x0FFF. Because the virtual PTP bridge identifier field 409 specifies a virtual PTP bridge identifier value in entry 401, the virtual PTP bridge identified by that value "PTP A" is assigned to, or is owned by the compute element 100-1, which comprises the north chip 137-1, which comprises the routing table 145-1A. Ownership or assignment means that the compute element 100-1 is the only compute element that sends read and write commands to the assigned or owned device 160-1, and, e.g., the compute element 100-2 does not send read and/or write commands to the assigned or owned device 160-1. In one embodiment, the owned device 160-1 is a particular resource within a single endpoint. Thus, multiple compute elements (i.e., hosts) may communicate with an endpoint that has multiple resources but only one compute element communicates with each resource within the endpoint.

The device 160-1 is connected to the virtual PTP bridge 149-1 identified by the virtual PTP bridge identifier 409 of "PTP A" via a bus whose bus identifier is encompassed by or falls within the range of bus identifiers specified by the secondary bus identifier 411 of "Bus A" and the subordinate bus identifier 412 of "Bus A." The virtual PTP bridge 149-1 identified by the virtual PTP bridge identifier 409 of "PTP A" forwards configuration commands that specify a bus identifier encompassed by the range of the secondary bus identifier 411 of "Bus A" and the subordinate bus identifier 412 of "Bus A" to the buses, PTP bridges, and devices 160 that are downstream from the virtual PTP bridge 149-1 "PTP A." The virtual PTP bridge 149-1 identified by the virtual PTP bridge identifier 409 of "PTP A" forwards MMIO commands that specify an MMIO address encompassed by the MMIO bus address range 414 of 0x0000 through 0x0FFF to the buses, PTP bridges, and devices 160 that are downstream from the virtual PTP bridge "PTP A."

Thus, in response to the CPU 101-7 issuing a read/write command from/to a MMIO address within or encompassed by the range of 0x0000 through 0x0FFF, the north chip 137-1 finds the MMIO bus address range 414 in the entry 401 that encompasses the MMIO address specified by the read/write command and sends the read/write command to the device 160-1 that is connected via the Bus A (to the virtual PTP bridge A 149-1 in the south chip C 143-1 and does not send the command to other devices.

The example entry 402 in the routing table 145-1A comprises data that indicates that the south chip 143-2 identified by the value "Chip D" in the south chip identifier field 410 comprises a virtual PTP bridge 149-3 identified by the value "PTP C" in the virtual PTP bridge identifier field 409 that is assigned or that maps or translates to a secondary bus identifier 411 of "Bus C," a subordinate bus identifier 412 of "Bus C," and an MMIO bus address range 414 of 0x2000-0x2FFF.

A device 160-3 is connected to the virtual PTP bridge 149-3 identified by the virtual PTP bridge identifier 409 of "PTP C" via a bus whose bus identifier is encompassed by or falls within the range of bus identifiers specified by the secondary bus identifier 411 of "Bus C" and the subordinate bus identifier 412 of "Bus C." The virtual PTP bridge 149-3 identified by the virtual PTP bridge identifier 409 of "PTP C" forwards configuration commands that specify a bus identifier encompassed by the range of the secondary bus identifier 411 of "Bus C" and the subordinate bus identifier 412 of "Bus C" to the buses, PTP bridges, and devices 160 that are downstream from the virtual PTP bridge "PTP C." The virtual PTP bridge 149-3 identified by the virtual PTP bridge identifier 409 of "PTP C" forwards MMIO commands that specify an MMIO address encompassed by the MMIO bus address range 414 of 0x2000-0x2FFF to the buses, virtual PTP bridges 149, and devices 160 that are downstream from the virtual PTP bridge "PTP C."

Thus, in response to the CPU 101-7 issuing a read/write command from/to a MMIO address within or encompassed by the range of 0x2000 through 0x2FFF, the north chip 137-1 finds the MMIO bus address range 414 in the entry 402 that encompasses the MMIO address specified by the read/write command and sends the read/write command to the device 160-3 that is connected via the Bus C to the virtual PTP bridge C 149-3 in the south chip D 143-2 and does not send the command to other devices.

FIG. 5 depicts a block diagram of an example data structure for a routing table 145-2A in a destination compute element, prior to the movement of the ownership of a device from an origin compute element to the destination compute element, according to an embodiment of the invention. The routing table 145-2A is an example of, and is generically referred to by the routing table 145-2 (FIG. 3).

The routing table 145-2A comprises example entries 501 and 502, each of which includes a virtual PTP bridge identifier field 509, a south chip identifier field 510, a secondary bus identifier field 511, a subordinate bus identifier field 512, and an MMIO bus address range field 514. The routing table 145-2A further comprises an example entry 503, which is unused.

The MMIO bus address range field 514 specifies a range or extent of MMIO addresses that the compute element 100-2 may use to address the memory of a device or devices 160 that are downstream from the virtual PTP bridge 149 (identified by the value in the virtual PTP bridge identifier field 509 in the same entry) in a south chip 143 (identified by the value in the south chip identifier field 510 in the same entry). The downstream device or devices 160 are connected to the virtual PTP bridge 509 via a bus or buses whose bus identifiers are encompassed by, or are within, the bus range specified by the secondary bus identifier 511 and the subordinate bus identifier 512, in the same entry. The secondary bus identifier 511 identifies the bus immediately downstream from the virtual PTP bridge 509. The subordinate bus identifier 512 specifies the highest bus identifier of all of the buses that can be reached downstream from the virtual PTP bridge 509.

Referring again to FIG. 5, in the example routing table 145-2A, each entry 501 and 502 has identical respective secondary bus identifiers 511 and subordinate bus identifiers 512 because, in the example of FIG. 3, each virtual PTP bridge 149-2 and 149-4 has one downstream bus connected to their respective egress ports. But, in other embodiments, the I/O elements 132 may include a hierarchy of virtual PTP bridges 149, in which a particular virtual PTP bridge 149 has multiple downstream PTP bridges 149 and/or buses. The MMIO bus address range field 514 specifies a beginning (lower bound or memory base address) of the range and an end (upper bound or memory limit address) of the range.

The values in the MMIO bus address range field 514 are unique within the compute element 100-2 that assigns them, but are not necessarily unique within a south chip 143 or across all south chips 143.

Thus, the routing table 145-2A represents mappings or translations of MMIO bus address ranges 514, secondary bus identifiers 511, and subordinate bus identifiers 512 used by the compute element 100-2 to virtual PTP bridge identifiers 509 that identify virtual PTP bridges 149 that are contained within south chips identified by the chip identifiers 510, in the same row. Thus, the MMIO bus address range 514, the secondary bus identifier 511, and the subordinate bus identifier 512 are assigned to the virtual PTP bridge identifier 509 and the south chip identifier 510 in the same entry.

The example entry 501 in the routing table 145-2A comprises data that indicates that the south chip 143-1 identified by the value "Chip C" in the south chip identifier field 510 comprises a virtual PTP bridge 149-2 identified by the value "PTP B" in the virtual PTP bridge identifier field 509 that is assigned a secondary bus identifier 511 of "Bus B," a subordinate bus identifier 512 of "Bus B," and an MMIO bus address range 514 of 0x1000-0x1FFF.

The device 160-2 is connected to the virtual PTP bridge 149-2 identified by the virtual PTP bridge identifier 509 of "PTP B" via a bus whose bus identifier is encompassed by or falls within the range of bus identifiers specified by the secondary bus identifier 511 of "Bus B" and the subordinate bus identifier 512 of "Bus B." The virtual PTP bridge 149-2 identified by the virtual PTP bridge identifier 509 of "PTP B" forwards configuration commands that specify a bus identifier encompassed by the range of the secondary bus identifier 511 of "Bus B" and the subordinate bus identifier 512 of "Bus B" to the buses, PTP bridges, and devices 160 that are downstream from the virtual PTP bridge "PTP B." The virtual PTP bridge 149-2 identified by the virtual PTP bridge identifier 509 of "PTP B" forwards MMIO commands that specify an MMIO address encompassed by the MMIO bus address range 514 of 0x1000-0x1FFF to the buses, PTP bridges, and devices 160 that are downstream from the virtual PTP bridge "PTP B."

Thus, in response to the CPU 101-8 issuing a read/write command from/to a MMIO address within or encompassed by the range of 0x1000 through 0x1FFF, the north chip 137-2 finds the MMIO bus address range 514 in the entry 501 that encompasses the MMIO address specified by the read/write command and sends the read/write command to the device 160-2 that is connected via the Bus B to the virtual PTP bridge B 149-2 in the south chip C 143-1 and does not send the command to other devices.

The example entry 502 in the routing table 145-2A comprises data that indicates that the south chip 143-2 identified by the value "Chip D" in the south chip identifier field 510 comprises a virtual PTP bridge 149-4 identified by the value "PTP D" in the virtual PTP bridge identifier field 509 that is assigned a secondary bus identifier 511 of "Bus D," a subordinate bus identifier 512 of "Bus D," and an MMIO bus address range 514 of 0x3000-0x3FFF.

A device 160-4 is connected to the virtual PTP bridge 149-4 identified by the virtual PTP bridge identifier 509 of "PTP D" via a bus whose bus identifier is encompassed by or falls within the range of bus identifiers specified by the secondary bus identifier 511 of "Bus D" and the subordinate bus identifier 512 of "Bus D." The virtual PTP bridge 149 identified by the virtual PTP bridge identifier 509 of "PTP D" forwards configuration commands that specify a bus identifier encompassed by the range of the secondary bus identifier 511 of "Bus D" and the subordinate bus identifier 512 of "Bus D" to the buses, virtual PTP bridges 149, and devices 160 that are downstream from the virtual PTP bridge "PTP D" and does not forward configuration commands downstream whose bus identifier is not encompassed by the range. The virtual PTP bridge 149 identified by the virtual PTP bridge identifier 509 of "PTP D" forwards MMIO commands that specify an MMIO address encompassed by the MMIO bus address range 514 of 0x3000-0x3FFF to the buses, virtual PTP bridges 149, and devices 160 that are downstream from the virtual PTP bridge "PTP D" and does not forward MMIO commands downstream whose MMIO address is not encompassed by the range.

Thus, in response to the CPU 101-8 issuing a read/write command from/to a MMIO address within or encompassed by the range of 0x3000 through 0x3FFF, the north chip 137-2 finds the MMIO bus address range 514 in the entry 502 that encompasses the MMIO address specified by the read/write command and sends the read/write command to the device 160-4 that is connected via the bus D to the virtual PTP bridge D 149-4 in the south chip D 143-2 and does not send the command to other devices.

FIG. 6 depicts a block diagram of an example data structure for a routing table 145-1B in the origin compute element, after the movement of the ownership of a device from the origin compute element to the destination compute element, according to an embodiment of the invention. The routing table 145-1B is an example of, and is generically referred to by the routing table 145-1 (FIG. 3).

The routing table 145-1B comprises an example entry 601, which includes a virtual PTP bridge identifier field 609 (analogous to the virtual bridge identifier field 409), a south chip identifier field 610 (analogous to the south chip identifier field 410), a secondary bus identifier field 611 (analogous to the secondary bus identifier field 411), a subordinate bus identifier field 612 (analogous to the subordinate bus identifier field 412), and an MMIO bus address range field 614 (analogous to the MMIO bus address range field 414).

The entry 601 is identical to the entry 401 in FIG. 4 because the ownership of the device 160-1 has not changed and remains assigned to the compute element 100-1. The entry 402, which was present in FIG. 4, is missing in FIG. 6 because the target device 160-3 has changed ownership from the compute element 100-1 to the compute element 100-2. After the movement of the ownership of the target device 160-3 from the origin compute element, the north chip 137-1 no longer sends commands from the origin compute element 100-1 to the target device 160-3 because the target virtual PTP bridge identifier of "PTP C," which identifies the target device 160-3, is no longer in the routing table 145-1B. Thus, FIGS. 4 and 6 illustrate that the management controller removes, from the origin compute element, the translation of a virtual bridge identifier to a bus identifier, a subordinate bus identifier, and a MMIO bus address range, for the target device.

FIG. 7 depicts a block diagram of an example data structure for a routing table 145-2B in the destination compute element, after the movement of the ownership of a device from the origin compute element to the destination compute element, according to an embodiment of the invention. The routing table 145-2B is an example of, and is generically referred to by the routing table 145-2 (FIG. 3). The routing table 145-2B comprises example entries 701, 702, and 703, each of which comprises a virtual PTP bridge identifier field 709 (analogous to the virtual bridge identifier field 509), a south chip identifier field 710 (analogous to the south chip identifier field 510), a secondary bus identifier field 711 (analogous to the secondary bus identifier field 511), a subordinate bus identifier field 712 (analogous to the subordinate bus identifier field 512), and an MMIO bus address range field 714 (analogous to the MMIO bus address range field 514).

The data values in the entries 701 and 702 are identical to the entries 501 and 502 in FIG. 5 because the ownership of the devices 160-2 and 160-4 has not changed and remains assigned to the compute element 100-2. The entry 703, which is present in FIG. 7, is analogous to the unused entry 503 in FIG. 5 because the device 160-3, which was previously assigned to the compute element 100-1 (as illustrated by the entry 402 in FIG. 4) has changed ownership from the compute element 100-1 to the compute element 100-2, so the values in the entry 703 are added to the previously unused entry 503. The data values in the row 703 for the secondary bus identifier 711, the subordinate bus identifier 712, and the MMIO bus address range 714 may be the same or different from the row 402 because the compute elements 100-1 and 100-2 assign their secondary bus identifiers, subordinate bus identifiers, and MMIO bus address ranges independently from each other.

After the movement of the ownership of the target device 160-3 from the origin compute element to the destination compute element, the north chip 137-2 begins sending commands from the destination compute element 100-2 to the target device 160-3 because the target virtual PTP bridge identifier of "PTP C" (entry 703) that identifies the target device 160-3 is now in the routing table 145-2B. Thus, FIGS. 5 and 7 illustrate that the management controller adds, to the destination compute element, the translation of a virtual bridge identifier to a bus identifier, a subordinate bus identifier, and a MMIO bus address range, for the target device.

II. Broadcast Within a Distributed Switch

Generally, embodiments provide techniques for broadcasting a message within a distributed switch. For example, a host device could transmit a PCIe link status message to a first switch module within a distributed switch, indicating that a particular link needs to be reset. In response, logic on the first switch module could suspend traffic on the first switch module associated with the link for the host device. Additionally, the logic could iterate through a routing table on the first switch module, where the routing table specifies one or more other switch modules within the distributed switch that are connected to the first switch module, and could transmit a respective message specifying the PCIe link status message to each of the other switches. Of note, while the initial link status message transmitted to the first switch module could be a PCIe message, the messages transmitted to each of the other switches may conform to a separate and distinct message format. For instance, in a particular embodiment, the switch modules within the distributed switch may communicate with another via a proprietary communications protocol, and the initial link status message could be converted into an equivalent message in the proprietary communications protocol, which is then transmitted to the downstream switch module specified in the routing table on the first switch module.

The downstream switch modules, upon receiving the messages, could be configured to perform an operation corresponding to the received message to reset the link associated with the first host device. Once the operation has been performed successfully, the downstream switch modules could be configured to transmit an acknowledgement message to the first switch module. Upon receiving an acknowledgement message from each of the downstream switch modules, the first switch module could determine that the link has been reset successfully. Accordingly, the first switch module could resume the traffic on the first switch module associated with the link for the host device. Additionally, the first switch module could transmit an acknowledgement message to the host device, indicating that the reset operation for the link has completed. Of note, while the acknowledgement messages from the downstream switch modules may be encoded according to a first protocol (e.g., a proprietary communications protocol for switch modules communicating with one another within the distributed switch), the acknowledgement message to the host device could be encoded in the initial link status message's protocol. Thus, in this example, the logic could receive acknowledgement messages in a proprietary communications protocol from the downstream switch modules, and once all of these acknowledgement messages are received, the logic could transmit a PCIe acknowledgement message to the host device, indicating that the link has been successfully reset.

Figure 8:
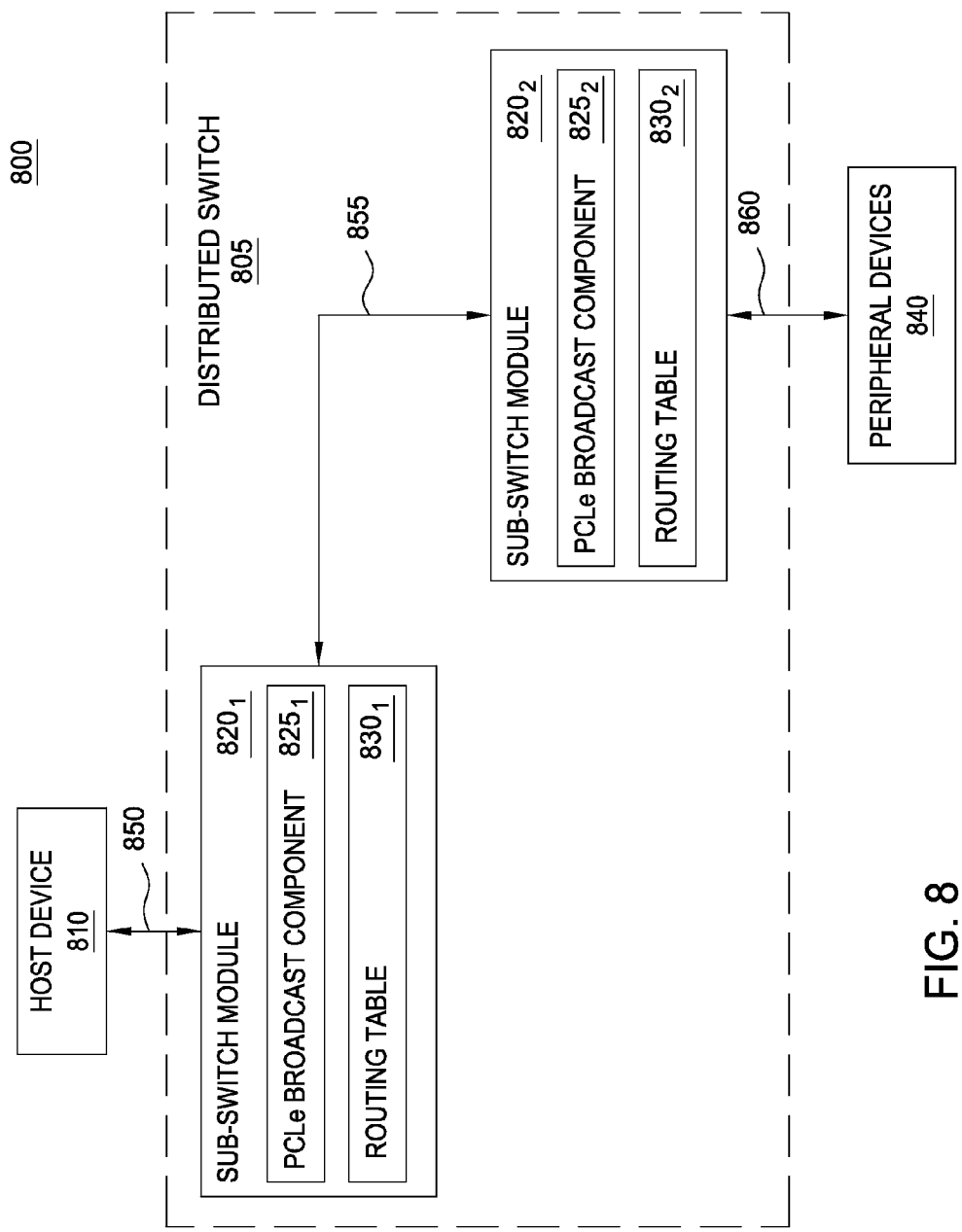
FIG. 8 depicts a block diagram of an example system configured with a PCIe broadcast component, according to an embodiment described herein.

An exemplary embodiment is shown in FIG. 8, which depicts a block diagram of an example system configured with a PCIe broadcast component, according to an embodiment described herein. The system 800 includes a host device 810 and a plurality of peripheral devices 840, connected via a distributed switch 805. In the depicted embodiment, the host device 810 is connected to the distributed switch 805 via a PCIe link 850, and the peripheral devices 840 are connected via PCIe link 860. The distributed switch 805 includes sub-switch modules 820, which are connected via links 855. Generally the links 855 can transmit data between the sub-switch modules 820 using any variety of different communication protocols. For example, the sub-switch $820_1$ could receive PCIe traffic from the host device 810 via the PCIe link 850, and could then convert the PCIe traffic into a proprietary communications protocol, for transmission within the distributed switch 805 over the links 855. The sub-switch $820_2$ could receive the converted traffic and could re-convert the traffic to conform with the PCIe protocol, before transmitting the traffic to the peripheral device 840 over the PCIe link 860.

As shown, the sub-switch modules 820 each include a PCIe broadcast component 825 and a routing table 830. Generally, the PCIe broadcast component 825 on each of the sub-switch modules 820 is configured to broadcast a message to a plurality of PCIe devices. For instance, the PCIe broadcast component $825_1$ could receive a link status update from the host device 810 over the link 850, indicating that the links 860 connecting the peripheral devices 840 to the host device 810 should be reset. Upon receiving the link status update, the PCIe broadcast component $825_1$ could iterate through the routing table $830_1$ and the PCIe broadcast component $825_1$ could transmit a broadcast message specifying the link status update, for each of the downstream network devices in the routing table $830_1$.

Upon receiving the broadcast message, the PCIe broadcast component $825_2$ on the sub-switch module $820_2$ could perform a reset on the PCIe links 860 connecting the host device 810 and the peripheral devices 840. For example, the sub-switch module $820_2$ could perform a reset operation corresponding to the received broadcast message. In one embodiment, the sub-switch module $820_2$ is configured to transmit a message (e.g., a link status update, an operation to be executed, etc.) to one of the peripheral devices 840, instructing the peripheral device 840 to perform a reset operation for its link 860. Once the reset operation for each of the links 860 is completed, the sub-switch module $820_2$ is configured to transmit an acknowledgement message back to the PCIe broadcast component $825_1$ on the sub-switch module $820_1$. In one embodiment where the peripheral devices 840 are configured to perform reset operations for their respective links, the PCIe broadcast component $825_1$ could generate the acknowledgement message, and could transmit the acknowledgement message to the sub-switch module $820_2$, to be forwarded to the PCIe broadcast component $825_1$.

Upon transmitting the broadcast messages, the PCIe broadcast component $825_1$ could begin waiting on acknowledgement messages for each of the downstream PCIe links 860. Once the acknowledgement messages have been received for all of the links 860, the PCIe broadcast component $825_1$ could conclude that the PCIe links 860 have been reset successfully. Additionally, in one embodiment, the PCIe broadcast component $825_1$ is configured to rebuild the routing table $830_1$, once all of the acknowledgement messages have been received.

In one embodiment, the PCIe broadcast component $825_1$ on the sub-switch module $820_1$ is configured to store incoming network traffic for the first port in a buffer, while the network traffic for the first port is suspended. Upon resuming network traffic for the first port, the PCIe broadcast component $825_1$ could transmit the stored network traffic from the buffer to corresponding downstream switch modules in the plurality of downstream switch modules. Advantageously, doing so helps to ensure that no traffic flowing through the first switch module is lost, while the link for the host device is being reset.

In a particular embodiment, various reset operations may be associated with corresponding priority values. These priority values could be used to determine which request should be processed, when multiple requests for distinct reset operations are received. For instance, after transmitting the messages to the downstream switch modules, but before acknowledgement messages have been received from all of the downstream switch modules, the PCIe broadcast component $825_1$ on the sub-switch module $820_1$ could receive a second request to reset the link for the host device 810, the reset to be performed using a second, different operation. The PCIe broadcast component $825_1$ could then determine whether the second request is a higher priority request relative to the first request. For example, the PCIe broadcast component $825_1$ could determine a priority value associated with each of the requests, and could compare the determined priority values to determine which of the requests is the higher priority request.

Upon determining that the second request is a higher priority request relative to the first request, the PCIe broadcast component $825_1$ could transmit a respective second broadcast message to each of the plurality of downstream switch modules (e.g., the sub-switch $820_2$), specifying a second operation to be performed for resetting the links 860. Additionally, the PCIe broadcast component $825_1$ could then disregard any acknowledgement messages received for the first request. Advantageously, doing so allows the PCIe broadcast component $825_1$ to resolve conflicts between multiple incoming requests.

In some embodiments, the PCIe communications between the peripheral devices connected to the distributed switch may permit these devices to communicate with multiple host devices at the same time. Thus, using these techniques, a particular one of the peripheral devices 840 could communicate with the host device 810 and other host devices, using a single PCIe communication link. In such an embodiment, although the PCIe broadcast component $825_1$ could suspend and buffer the PCIe traffic for the host device 810, other PCIe traffic for the peripheral devices 840 could continue to flow through the sub-switch $820_1$, from other devices than the host device 810.

More generally, it is broadly contemplated that a number of broadcast operations can be performed, consistent with embodiments described herein. Examples of such broadcast operations include, without limitation, a PME_Turn_Off message, a standard link reset, a PERST assert, and a PERST deassert. Generally speaking, a PME_Turn_Off message is a PCIe message command to request that all endpoints move to an "off" link state. For example, a switch module configured with a PCIe broadcast component 825 could receive the PME_Turn_Off command from a host device, and could broadcast the PME_Turn_Off message to a number of endpoint devices within or coupled to the distributed switch, requesting that the endpoint devices set their link state to "off". Additionally, the endpoint devices may respond to the broadcast message with a PME_TO_Ack message. The switch module could gather all of the PME_TO_Ack messages and return a single PME_TO_Ack message to the host device once all the links for the endpoint devices are set to a link status of "off". In one embodiment, the PME_Turn_Off message is the lowest priority broadcast recognized by the PCIe broadcast component 825, with the PERST assert and PERST deassert are the highest priority broadcasts, and the standard link reset having a priority in between.

As another example, a standard link reset may occur in a number of different ways. For instance, if the upstream link is reset, e.g., the link between the host device and a switch module configured with the PCIe broadcast component 825, the switch module could broadcast a standard link reset to downstream switch modules associated with the host device. As yet another example, the host device could send a command to the switch module configured with the PCIe broadcast component 825, requesting a link reset on the downstream port using a standard link reset operation. While a PCIe standard link reset operation does not normally include an acknowledgement message, embodiments could be configured to determine when the standard link reset operation has been completed (e.g., on the links of the downstream switch modules) and to transmit an acknowledgement message back to the upstream switch module (i.e., the switch module broadcasting the command) in response to such a determination. Similarly, with respect to the PERST assert and PERST deassert operations, these operations may not ordinarily involve an acknowledgement message. However, embodiments could be configured to determine when these operations have completed successfully and to transmit an acknowledgement message to the upstream switch module (i.e., the switch module broadcasting the command) in response. Advantageously, doing so enables switch modules configured with the PCIe broadcast component 825 to track the status of their broadcast commands and to ensure that the broadcast command was successfully performed by all the downstream switch modules, before resuming traffic for the host device over the suspended ports.

Figure 9:
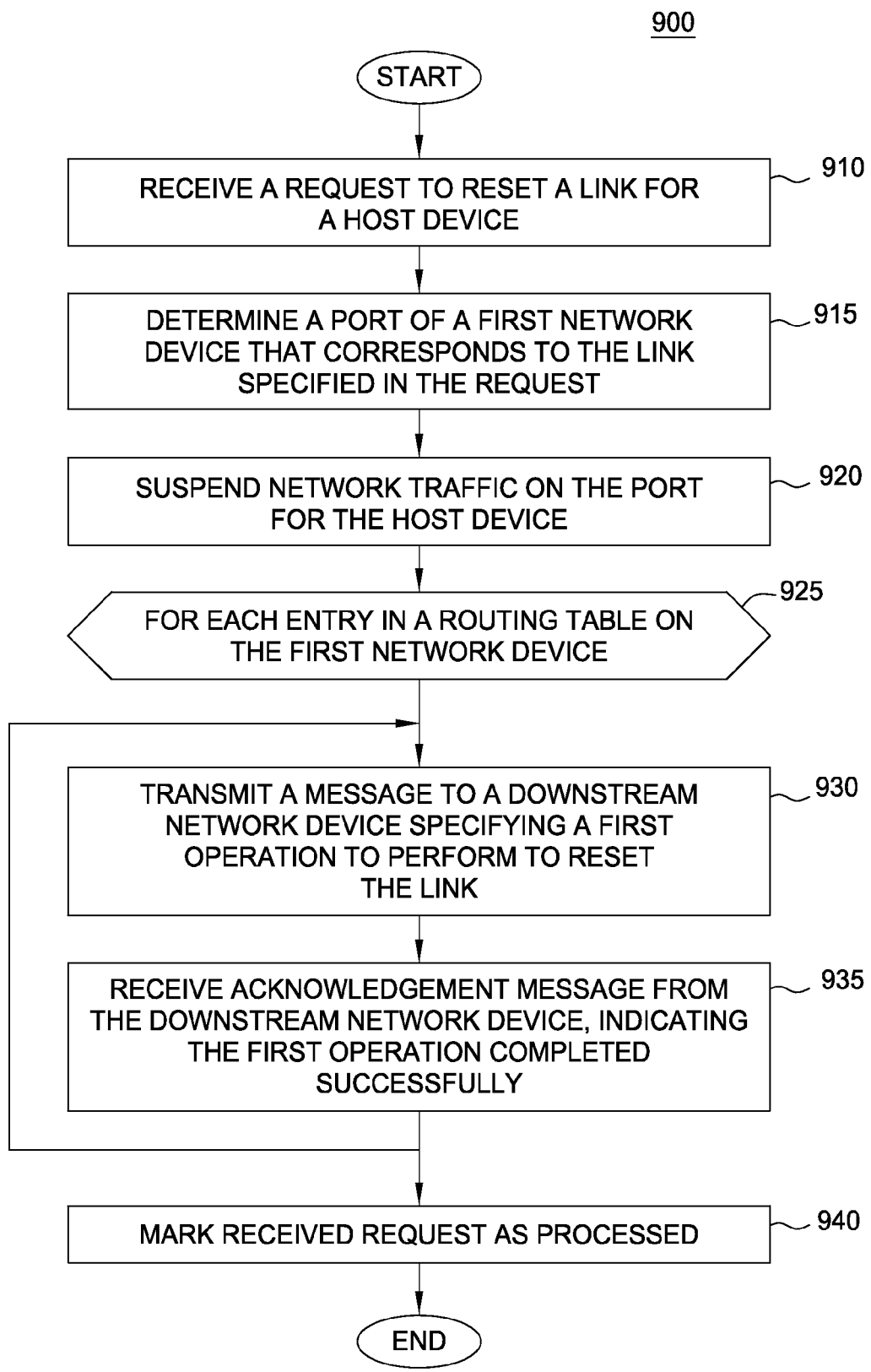
FIG. 9 is a flow diagram illustrating a method for broadcasting a reset command in a distributed network switch, according to an embodiment described herein.

FIG. 9 is a flow diagram illustrating a method for broadcasting a reset command in a distributed network switch, according to an embodiment described herein. As shown, the method 900 begins at block 910, where the PCIe broadcast component 825 receives a request to reset one or more links for a host device. The PCIe broadcast component 825 then determines one or more ports of the first sub-switch that correspond to the PCIe links specified in the received request (block 915). In one embodiment, the determined ports connect the first sub-switch modules to one or more other sub-switch modules within the distributed switch, and each of the other sub-switch modules includes a respective one or more PCIe ports that are to be reset. For example, referring back to the previous example of the system 800, the PCIe broadcast component $825_1$ could determine that a particular port of the sub-switch module $820_1$ that connects to the sub-switch module $820_2$ corresponds to the PCIe links 860, connecting the sub-switch module $820_2$ to the peripheral devices 840.

The PCIe broadcast component 825 then suspends PCIe traffic for the host device on the determined port (block 920). In one embodiment, the PCIe broadcast component 825 is configured to buffer traffic for the host device on the determined port(s) while the traffic is suspended. Once the downstream links (e.g., the links 860) have been reset, the PCIe broadcast component 825 could then transmit the buffered traffic over the port(s). Advantageously, doing so ensures that the PCIe traffic is not lost, while the reset operation is being processed.

The method 900 then enters a loop for each entry in a routing table on the first network device (block 925), where the PCIe broadcast component 825 transmits a message to a downstream network device corresponding to the entry in the routing table (block 930). Here, the transmitted message specifies a first operation to be performed to reset a PCIe link. In one embodiment, the transmitted message is a link status update and the downstream network device is configured to perform the first operation responsive to receiving the link status update from the first host device.

Generally, the downstream network devices (e.g., the sub-switch $820_2$ in the system 800) are configured to perform the first operation to reset the specified PCIe link upon receiving the transmitted message. In one embodiment, the downstream network devices are configured to forward the received message (or a corresponding, separate message) to one or more PCIe devices (e.g., the peripheral devices 840), and the PCIe devices are configured to perform the first operation to reset their corresponding PCIe link. Once the first operation has been successfully performed, the downstream network devices are configured to transmit an acknowledgement message back to the PCIe broadcast component 825 on the first network device. Such an acknowledgement message can originate, for instance, at the downstream network device (e.g., where the downstream network device performs the reset operation) or at one of the PCIe devices (e.g., where the PCIe devices performs the reset operation).

Returning to the method 900, the PCIe broadcast component 825 then receives acknowledgement message from the downstream network device (block 935). The blocks 930 and 935 are then repeated, for each entry in the routing table on the first network device. Once the PCIe broadcast component 825 has received an acknowledgement message from each of the downstream network devices, the PCIe broadcast component 825 marks the request as processed (block 940), and the method 900 ends. In one embodiment, if the PCIe broadcast component 825 does not receive an acknowledgement message for each of the transmitted messages within a predetermined period of time, the PCIe broadcast component 825 could determine that the reset operation for at least one of the downstream PCIe links did not complete successfully. In such a scenario, the PCIe broadcast component 825 could generate a log entry or another form of notification, indicating that the downstream PCIe link(s) were not reset successfully. In one embodiment, the PCIe broadcast component 825 is configured to resume network traffic for the host device for only the downstream PCIe links that were successfully reset.

Figure 10:
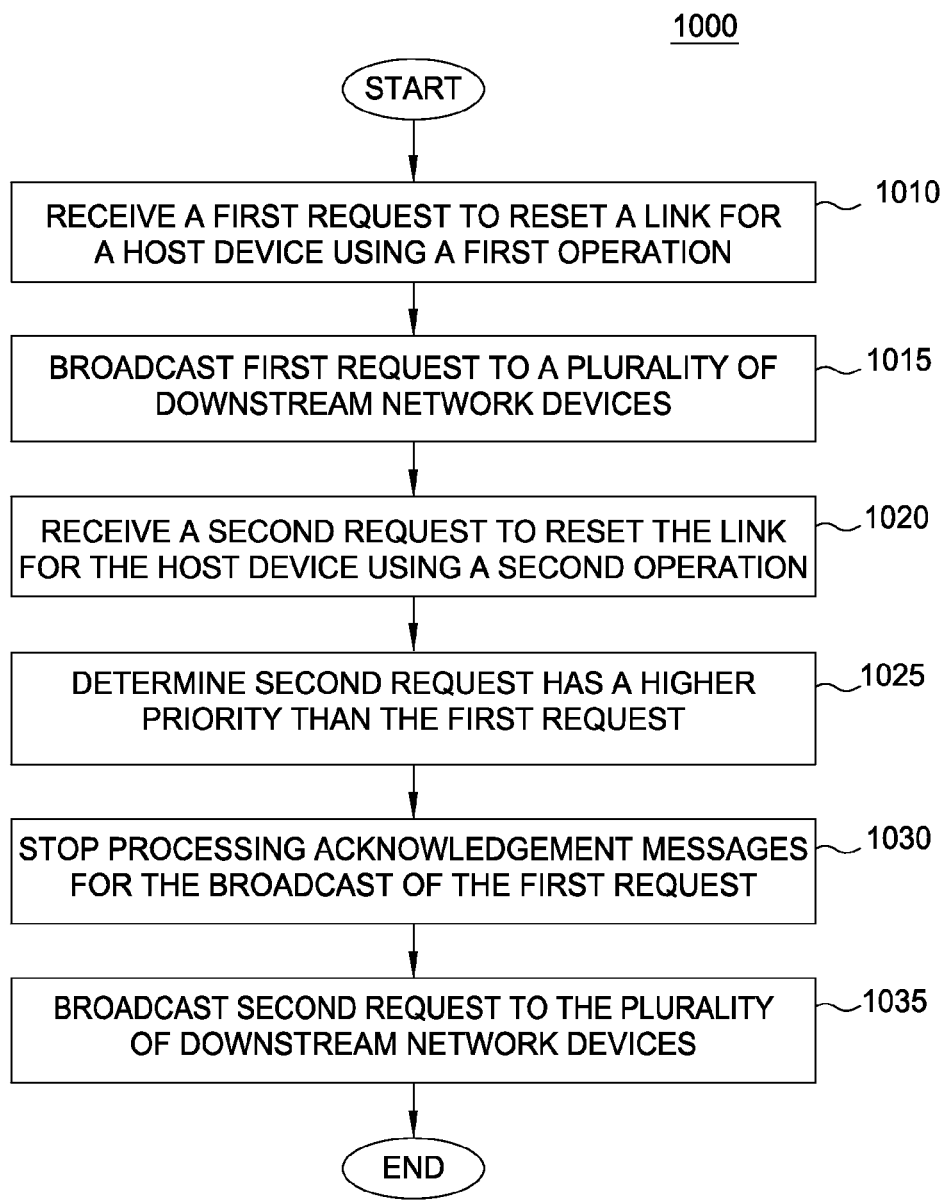
FIG. 10 is a flow diagram illustrating a method for processing prioritized broadcast requests in a distributed network switch, according to an embodiment described herein.

FIG. 10 is a flow diagram illustrating a method for processing prioritized broadcast requests in a distributed network switch, according to an embodiment described herein. As shown, the method 1000 begins at block 1010, where the PCIe broadcast component 825 receives a first request to reset a PCIe link for a host device using a first reset operation. As discussed above, a number of different reset operations may be used in accordance with the present disclosure. For example, the PCIe broadcast component 825 could be configured to recognize, without limitation, a PME_Turn_Off operation, a standard link reset operation, a PERST assert operation, and a PERST deassert operation. More generally, it is broadly contemplated that the PCIe broadcast component 825 could be configured to broadcast any reset operation (or any other operation) within the distributed switch.

The PCIe broadcast component 825 then broadcasts the first request to a plurality of downstream network devices in the distributed switch (block 1015). For example, the PCIe broadcast component 825 could iterate through the entries of a routing table on a first network device at which the first request was received, and could transmit the first request to the respective downstream network device specified in each of the entries within the routing table.

Once the first request has been broadcast, but before the acknowledgement messages have been received from each of the downstream network devices, the PCIe broadcast component 825 receives a second request to reset the link for the host device using a second reset operation (block 1020). In the depicted example, the PCIe broadcast component 825 then determines that the second request is a higher priority request, relative to the first request (block 1025). For example, the PCIe broadcast component 825 could be preconfigured to associate different priority values with each of a plurality of different reset operations. Continuing this example, the PCIe broadcast component 825 could determine respective priority values for the first reset operation and the second reset operation, and could compare these priority values to determine which of the requests has a higher relative priority. In the event that the PCIe broadcast component 825 determines that the second request is a lower priority request relative to the first request, the PCIe broadcast component 825 could simply disregard the second request, as a higher priority reset operation is already in progress.

Returning to the present example, upon determining that the second request has the higher relative priority, the PCIe broadcast component 825 stops processing acknowledgement messages for the broadcast of the first request (block 1030). For example, the PCIe broadcast component 825 could be configured to discard subsequently received acknowledgement messages pertaining to the broadcast of the first request. At block 1035, the PCIe broadcast component 825 then broadcasts the second request to the plurality of downstream network devices (e.g., using the method 800), and the method 1000 ends. Advantageously, doing so provides a PCIe reset broadcast operation for a distributed switch.

In the preceding, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the preceding aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications or related data available in the cloud being run or stored on the servers. For example, an application could execute on a server coupled to one or more peripheral devices in the cloud via a distributed switch, and the aforementioned techniques could be used to broadcast a reset operation for the PCIe links of the peripheral devices. Doing so allows a user to access these devices from any computing system attached to a network connected to the cloud (e.g., the Internet).

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A computer-readable storage memory containing a program that, when executed, performs an operation for broadcasting a command at a first switch module within a distributed switch, comprising:

receiving a first request to reset a PCIe link for a first host device, wherein the first host device is connected to a plurality of downstream PCIe devices through the distributed switch;

identifying a routing table specifying a plurality of downstream switch modules, connected to the first switch module by one or more ports of the first switch module;

suspending PCIe traffic for the first host device on the one or more ports of the first switch module;

while the PCIe traffic for the first host device is suspended, storing incoming PCIe traffic from the first host device for the one or more ports in a buffer;

transmitting a respective broadcast message to each of the plurality of downstream switch modules, specifying a first operation to be performed for resetting the PCIe link for the first host device;

upon receiving an acknowledgement message from each of the plurality of downstream switch modules specified in the routing table, resuming PCIe traffic for the first host device on the one or more ports; and upon resuming PCIe traffic for the first host device, transmitting the stored incoming PCIe traffic from the buffer to corresponding downstream switch modules in the plurality of downstream switch modules.

2. The computer-readable storage memory of claim 1, the operation further comprising:
  receiving a second request to reset the PCIe link for the first host device; and
  determining whether the second request is a higher priority request relative to the first request.

3. The computer-readable storage memory of claim 2, the operation further comprising:
  upon determining that the second request is a higher priority request relative to the first request, and before the acknowledgement messages are received from all of the plurality of downstream switch modules:
    disregarding any subsequently received acknowledgement messages pertaining to the transmitted broadcast messages specifying the first operation; and
    transmitting a respective second broadcast message to each of the plurality of downstream switch modules, specifying a second operation to be performed for resetting the PCIe link for the first host device.

4. The computer-readable storage memory of claim 1, wherein PCIe traffic from a second host device continues to flow through the one or more ports, while the PCIe traffic from the first host device for the one or more ports is suspended.

5. The computer-readable storage memory of claim 1, the operation further comprising:
  upon receiving an acknowledgement message from each of the plurality of downstream switch modules specified in the routing table, performing an operation for discovering downstream switch modules to rebuild the routing table.

6. The computer-readable storage memory of claim 1, wherein the received acknowledgement messages originate from at least one of a downstream switch module and a peripheral device coupled to the downstream switch module.

7. The computer-readable storage memory of claim 1, wherein the transmitted broadcast message comprises a PCIe reset message.

8. A switch module within a distributed switch, comprising:
  a processor;
  a plurality of ports connected to a plurality of downstream switch modules within the distributed switch; and
  a memory containing a program that, when executed by the processor, performs an operation for broadcasting a command within the distributed switch, comprising:
    receiving a first request to reset a PCIe link for a first host device, wherein the first host device is connected to a plurality of downstream PCIe devices through the distributed switch;
    identifying a routing table specifying the plurality of downstream switch modules, connected to the switch module by the plurality of ports;
    suspending PCIe traffic for the first host device on the plurality of ports;
    while the PCIe traffic for the first host device is suspended, storing incoming PCIe traffic from the first host device for the plurality of ports in a buffer;
    transmitting a respective broadcast message to each of the plurality of downstream switch modules, specifying a first operation to be performed for resetting the PCIe link for the first host device;
    upon receiving an acknowledgement message from each of the plurality of downstream switch modules specified in the routing table, resuming PCIe traffic for the first host device on the plurality of ports; and
    upon resuming PCIe traffic for the first host device, transmitting the stored incoming PCIe traffic from the buffer to corresponding downstream switch modules in the plurality of downstream switch modules.

9. The system of claim 8, the operation further comprising:
  receiving a second request to reset the PCIe link for the first host device; and
  determining whether the second request is a higher priority request relative to the first request.

10. The system of claim 9, the operation further comprising:
  upon determining that the second request is a higher priority request relative to the first request, and before the acknowledgement messages are received from all of the plurality of downstream switch modules:
    disregarding any subsequently received acknowledgement messages pertaining to the transmitted broadcast messages specifying the first operation; and
    transmitting a respective second broadcast message to each of the plurality of downstream switch modules, specifying a second operation to be performed for resetting the PCIe link for the first host device.

11. The system of claim 8, wherein PCIe traffic from a second host device continues to flow through the one or more ports, while the PCIe traffic from the first host device for the plurality of ports is suspended.

12. The system of claim 8, the operation further comprising:
  upon receiving an acknowledgement message from each of the plurality of downstream switch modules specified in the routing table, performing an operation for discovering downstream switch modules to rebuild the routing table.

13. The system of claim 8, wherein the received acknowledgement messages originate from at least one of a downstream switch module and a peripheral device coupled to the downstream switch module.

14. The system of claim 8, wherein the transmitted broadcast message comprises a PCIe reset message.

15. A switch module within a distributed switch, comprising:
  a processor;
  a plurality of ports connected to a plurality of downstream switch modules within the distributed switch; and
  a memory containing a program that, when executed by the processor, performs an operation for broadcasting a command within the distributed switch, comprising:
    receiving a first request to reset a PCIe link for a first host device, wherein the first host device is connected to a plurality of downstream PCIe devices through the distributed switch;
    identifying a routing table specifying the plurality of downstream switch modules, connected to the switch module by the plurality of ports;
    suspending PCIe traffic for the first host device on the plurality of ports;
    transmitting a respective broadcast message to each of the plurality of downstream switch modules, specifying a first operation to be performed for resetting the PCIe link for the first host device;
    receiving a second request to reset the PCIe link for the first host device;
    determining whether the second request is a higher priority request relative to the first request; and
    upon receiving an acknowledgement message from each of the plurality of downstream switch modules specified in the routing table, resuming PCIe traffic for the first host device on the plurality of ports.

16. The switch module of claim 15, the operation further comprising:

upon determining that the second request is a higher priority request relative to the first request, and before the acknowledgement messages are received from all of the plurality of downstream switch modules:

disregarding any subsequently received acknowledgement messages pertaining to the transmitted broadcast messages specifying the first operation; and transmitting a respective second broadcast message to each of the plurality of downstream switch modules, specifying a second operation to be performed for resetting the PCIe link for the first host device.

17. A computer-implemented method of broadcasting a command at a first switch module within a distributed switch, comprising:

receiving a first request to reset a PCIe link for a first host device, wherein the first host device is connected to a plurality of downstream PCIe devices through the distributed switch;

identifying a routing table specifying a plurality of downstream switch modules, connected to the first switch module by one or more ports of the first switch module;

suspending PCIe traffic for the first host device on the one or more ports of the first switch module;

while the PCIe traffic for the first host device is suspended, storing incoming PCIe traffic from the first host device for the one or more ports in a buffer;

transmitting a respective broadcast message to each of the plurality of downstream switch modules, specifying a first operation to be performed for resetting the PCIe link for the first host device;

upon receiving an acknowledgement message from each of the plurality of downstream switch modules specified in the routing table, resuming PCIe traffic for the first host device on the one or more ports; and upon resuming PCIe traffic for the first host device, transmitting the stored incoming PCIe traffic from the buffer to corresponding downstream switch modules in the plurality of downstream switch modules.

18. The method of claim 17, further comprising:

receiving a second request to reset the PCIe link for the first host device; and determining whether the second request is a higher priority request relative to the first request.

19. The method of claim 18, further comprising:

upon determining that the second request is a higher priority request relative to the first request, and before the acknowledgement messages are received from all of the plurality of downstream switch modules:

disregarding any subsequently received acknowledgement messages pertaining to the transmitted broadcast messages specifying the first operation; and transmitting a respective second broadcast message to each of the plurality of downstream switch modules, specifying a second operation to be performed for resetting the PCIe link for the first host device.

* * * * *